UNITED STATES PATENT OFFICE.

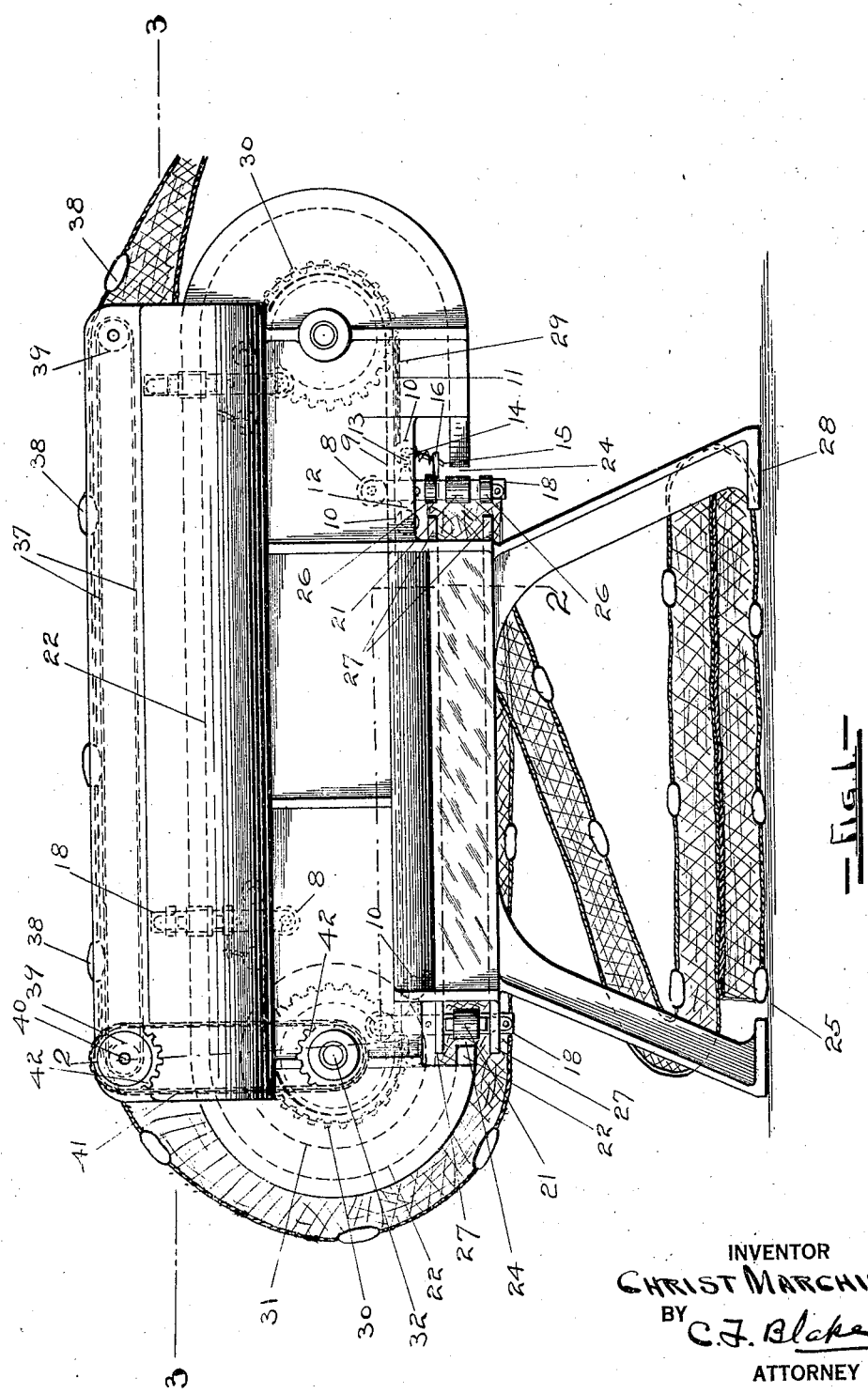

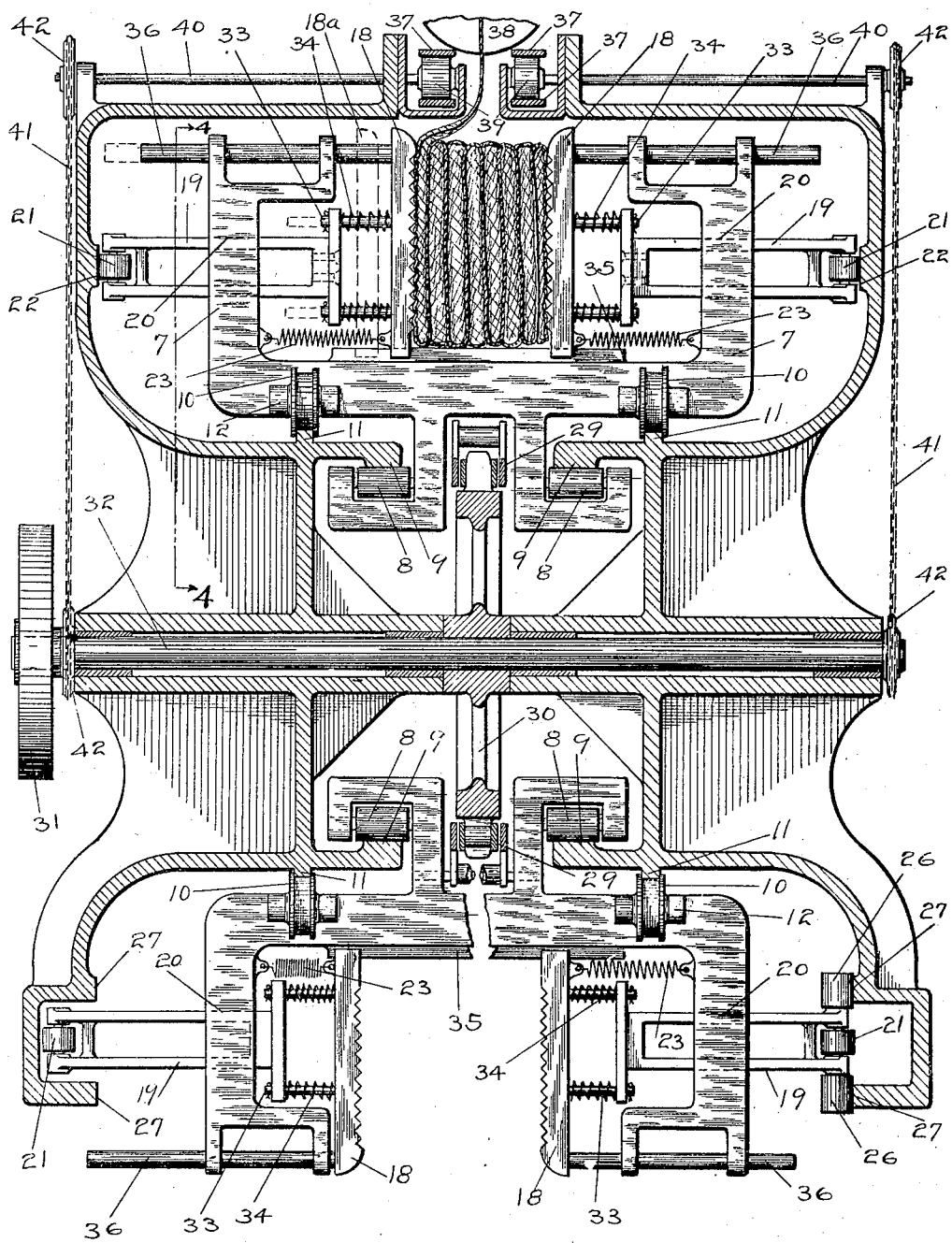

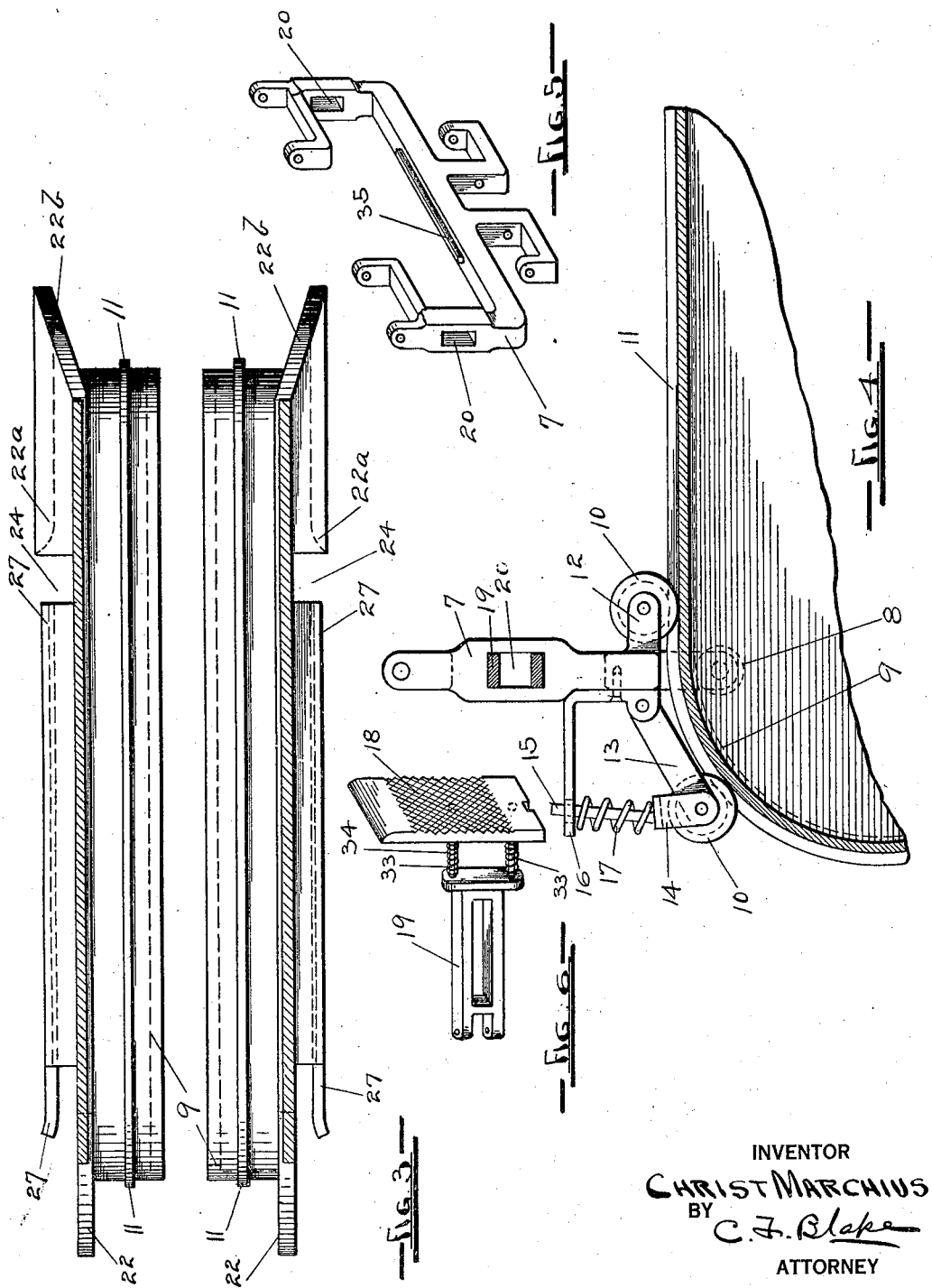

CHRIST MARCHIUS, OF PORTLAND, OREGON.

GILL-NET RETRIEVER.

1,353,604.  Specification of Letters Patent.  Patented Sept. 21, 1920.

Application filed November 11, 1919. Serial No. 337,250.

*To all whom it may concern:*

Be it known that I, CHRIST MARCHIUS, a citizen of Dalmatia, and a resident of Portland, county of Multnomah, State of Oregon, have invented certain new and useful Improvements in Gill-Net Retrievers, of which the following is a specification.

My invention relates to devices for hauling in or retrieving the gill nets of fishermen, the object being to provide a machine that may be mounted upon a fishing boat and operated preferably by power, that will haul in the net and deposit the same in orderly manner within the boat.

I accomplish the above object by means of the construction illustrated in the accompanying drawings, which are a part of this application for Letters Patent, like characters of reference indicating like parts throughout the several views thereof, and in which:

Figure 1 is a side elevation of my device.

Fig. 2 is a transverse sectional elevation upon line 2—2 of Fig. 1, upon an enlarged scale.

Fig. 3 is a sectional plan view of the main frame only, upon line 3—3 of Fig. 1.

Fig. 4 is a fragmentary sectional elevation upon line 4—4 of Fig. 2, illustrating the action of the rollers.

Fig. 5 is a perspective view of one of the movable carriage frames.

Fig. 6 is a perspective view of one of the clamping jaws and its guides.

In general my device consists of a frame containing a plurality of continuous tracks, a plurality of carriages moving upon said tracks, clamping jaws upon each of said carriages, means to move said carriages, and means upon certain of said tracks to open and close said jaws at predetermined points in the travel of said carriages.

Each carriage consists of a frame 7 having mounted thereon a pair of rollers 8 adapted to roll upon a track 9 of the main frame, and two pairs of rollers 10 adapted to roll upon a track 11 of the main frame. Said tracks 9 and 11 of the main frame each have parallel portions spaced vertically apart and connected at each end by semi-circular portions, as shown in Figs. 1 and 3, so that each track is a substantially continuous structure except that certain openings are provided as hereinafter explained.

The rollers 10 are mounted upon the carriage in pairs the rollers of each pair being upon oppositely disposed sides of the carriage frame 7, as shown in Figs. 1 and 4, while the rollers 8 are axially disposed in the medial plane of the carriage frame, resulting in the carriage always being held perpendicular to the tracks.

The rollers 8 being single will follow around the curved ends of their respective tracks, but as the rollers 10 are in pairs, means must be provided for each of them contacting with its respective track while passing around the curved portions thereof, and this I provide for as follows:

One of the rollers 10 is mounted between rigid bearings 12 upon the carriage frame 7, while the opposite roller 10 is pivotally connected to the carriage frame by links 13, the axle pin of this roller passing through said links and also through the prongs of a fork or yoke 14, which yoke is provided with a stem 15 which passes freely through an arm 16 projecting from the carriage frame, as shown in detail in Fig. 4, a spring 17 being mounted upon said stem 15 between said yoke 14 and said arm 16. By means of this construction the rollers 10 are enabled to retain contact with their respective tracks while traversing the curved portions thereof, as illustrated in Fig. 4.

For grasping the net, I provide upon each carriage a pair of oppositely disposed jaws 18, said jaws each being mounted upon guides 19 slidable in orifices 20 of the carriage frame 7 in a direction transversely of the direction of travel of the carriage.

In the end of each of said guides 19 opposite to that to which said jaws are attached is mounted a roller 21, which roller is maintained in contact with a track 22 upon the main frame by spring 23, as shown in Fig. 2.

The upper horizontal portions of tracks 22 are sufficiently close together to cause the jaws 18 to close upon the net when placed therebetween as the carriage travels, and the lower horizontal portions of said tracks are provided with an open space 24, thereby allowing the jaws 18 to spread under the impulse of the springs 23 when rollers 21 are traversing said open space 24, as shown in the lower left hand corner of Fig. 2, thereby releasing the net from the grasp of the jaws and depositing the same upon the floor beneath the machine at a point 25 substantially below that point at which roller 21 first enters space 24, as shown in Fig. 1, In order that the net may be deposited in orderly folds I provide that the jaws 18 upon each alternate carriage shall continue to grasp the net while the roller 21 traverses the length of the space 24, and release the net upon the roller 21 reaching the end of said space.

This I accomplish by providing each alternate carriage with rollers 26 upon the ends of the axis pins of rollers 21, as shown in Fig. 1, and also the right hand lower corner of Fig. 2. Auxiliary tracks 27 are provided extending over nearly the entire length of space 24, as shown in Fig. 1, upon which tracks rollers 27 roll in passing.

Immediately preceding the arrival of each alternate carriage, upon which is mounted the rollers 26, at the end of track 22 and the beginning of space 24, the rollers 26 contact with their respective auxiliary tracks 27 and thereby prevent the opening of the jaws 18 upon the carriage while it is passing the space 24, holding said jaws closed until the arrival of the carriage at the end of the auxiliary tracks 27 just previous to arriving at the end of space 24 and the beginning of track 22, at which point tracks 27 terminate and allow the spreading or opening of the jaws, and the releasing of the net, depositing the same at a point 28 upon the floor immediately beneath the end of space 24, as shown in Fig. 1.

By thus enabling each alternate carriage to release the net at opposite ends of the space 24 the net is deposited upon the floor beneath the machine in orderly folds, as shown in Fig. 1.

At the ends of space 24 the tracks 22 are spread sufficiently to receive the rollers 21 when the jaws 18 are open, as shown at 22$^a$ in Fig. 3 and as the carriages travel around the end of the machine toward the upper horizontal portion thereof tracks 22 converge, as shown at 22$^b$ in Fig. 3, thus causing the jaws 18 to close upon the net as it is fed to the machine.

The carriages are propelled by an endless chain 29 operating over sprocket wheels 30, as shown in Figs. 1 and 2, one of said sprockets being rotated by a pulley 31, which may be belted to any convenient source of power, and a shaft 32.

The movement of guides 19 is positive, and in order that the movement of the jaws 18 may be such as to accommodate net weights or other obstacles therebetween I mount said jaws upon pins 33 which pins are slidable in orifices in the ends of guides 19, and I provide springs 34 upon said pins between the jaws 18 and the guides 19, as shown in Figs. 2 and 6, whereby, should an obstacle be carried by the net between the jaws, the latter may open to accommodate such obstruction, as indicated in dotted lines at 18$^a$ in Fig. 2.

The jaws 18 are held in the carriage frame 7 by suitable guides 35 and 36.

In order that the floats upon the upper edge of the net may not interfere with the operation of the jaws 18 by being grasped thereby, I provide means to deflect said floats and cause their passage outside the sphere of action of said jaws, as follows:

Above the upper horizontal portion of tracks 22, and parallel therewith, I provide a pair of endless belts 37 adapted to receive the floats 38 thereupon and allow the net to depend therebetween, as shown in Fig. 2. Said belts 37 operate upon pulleys 39 mounted upon shafts 40, and are driven by chains 41 operating upon sprockets 42 upon shafts 32 and 40, as shown in Figs. 1 and 2.

My device may be made of any size, and constructed of any materials deemed convenient and suitable for a device of this character, and while I have illustrated and described a form of construction and arrangement of parts found desirable in materializing my invention, I wish to include in this application for Letters Patent all mechanical equivalents and substitutes that may fairly be considered to come within the scope and purview of my invention as defined in the appended claims.

Having disclosed my invention so that others may be enabled to construct and to use the same, what I claim as new and desire to secure by Letters Patent is:

1. In a gill net retriever, a main frame; endless tracks upon said main frame; carriages traveling upon said tracks; net grasping jaws upon said carriages; means to cause said jaws to grasp the net as it is fed to the upper portion of the device; means to cause certain alternate carriages to release the net at one end of the lower portion of the device; and means to cause the other alternate carriages to release the net at the opposite end of the lower portion of the device.

2. In a gill net retriever, a plurality of traveling carriages adapted to grasp and haul in the net, and means to cause said carriages to release the net at such predetermined points of their travel as will deposit the net in superposed folds or layers.

3. In a gill net retriever, a plurality of carriages traveling upon endless tracks; net grasping jaws upon each of said carriages; means to operate said jaws; and means whereby said jaws may accommodate an obstruction therebetween independently of said operating means.

4. In a gill net retriever, a plurality of endless tracks; a plurality of carriages traveling upon said tracks; guides mounted upon said carriages and slidable therein transversely to the direction of motion of said carriages; jaws upon said guides; rollers upon the outer ends of said guides; springs retaining said jaws in open position; tracks coacting with said rollers and having a space therein allowing said rollers to enter and thus open said jaws, and a converging portion causing said rollers to approach each other and thus close said jaws; auxiliary rollers upon each alternate carriage; auxiliary tracks coincident with said space and coacting with said auxiliary rollers to prevent the opening of said jaws as said alternate carriages traverse said space, said auxiliary tracks terminating adjacent the end of said space to allow the opening of said jaws.

5. In a gill net retriever, an endless track comprising parallel portions and semicircular portions connecting the ends of said parallel portions; a carriage; rollers upon said carriage and traveling upon said endless track; and means whereby one of said rollers may be deflected from its position relative to said carriage for the purpose of retaining its contact with said track as the carriage traverses said curved portion thereof.

6. In a gill net retriever, parallel endless tracks having curved and straight portions therein; a carriage; a trinity of rollers upon said carriage embracing and rolling upon said tracks in such a manner as to preserve said carriage always perpendicular to said straight portion of said tracks and radial to said curved portion of said tracks as said carriage traverses said portions.

In witness whereof I claim the foregoing as my own I hereunto affix my signature in the presence of two witnesses, at Portland, county of Multnomah, State of Oregon, this 16th day of Oct., 1919.

CHRIST MARCHIUS.

Witnesses:
C. F. BLAKE,
L. J. ROBINSON.